United States Patent
Lee et al.

(10) Patent No.: US 9,706,023 B2
(45) Date of Patent: Jul. 11, 2017

(54) MOBILE TERMINAL AND CONTROLLING METHOD THEREOF

(71) Applicant: LG ELECTRONICS INC., Seoul (KR)

(72) Inventors: Jieun Lee, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 14/095,425

(22) Filed: Dec. 3, 2013

(65) Prior Publication Data

US 2014/0155124 A1 Jun. 5, 2014

(30) Foreign Application Priority Data

Dec. 5, 2012 (KR) .................. 10-2012-0140196

(51) Int. Cl.
  *H04M 1/02* (2006.01)
  *G06F 3/0485* (2013.01)
  *G06F 3/0488* (2013.01)

(52) U.S. Cl.
  CPC ........ *H04M 1/0266* (2013.01); *G06F 3/0485* (2013.01); *G06F 3/0488* (2013.01); *G06F 3/04855* (2013.01)

(58) Field of Classification Search
  CPC ... G06F 3/0485; G06F 3/04855; G06F 3/0488
  USPC ....................................... 455/566
  See application file for complete search history.

(56) References Cited

U.S. PATENT DOCUMENTS

| 7,797,204 | B2 * | 9/2010 | Balent | G06Q 10/087 |
| | | | | 705/26.8 |
| 2007/0254722 | A1 * | 11/2007 | Kim | G06F 3/0485 |
| | | | | 455/566 |
| 2010/0049704 | A1 * | 2/2010 | Sumiya | G08G 1/0969 |
| | | | | 707/724 |
| 2010/0235770 | A1 * | 9/2010 | Ording | G06F 1/1626 |
| | | | | 715/765 |
| 2010/0251165 | A1 | 9/2010 | Williams | |

(Continued)

FOREIGN PATENT DOCUMENTS

| EP | 1531598 A2 | 5/2005 |
| EP | 2045700 A1 | 4/2009 |
| EP | 2385528 A1 | 11/2011 |

*Primary Examiner* — Qun Shen
(74) *Attorney, Agent, or Firm* — Birch, Stewart, Kolasch & Birch, LLP

(57) ABSTRACT

A method of controlling a mobile terminal, and which includes displaying at least one portion of a plurality of display items on a touchscreen of the mobile terminal; selecting at least one filtering condition; determining, via a controller of the mobile terminal, whether each of a plurality of the display items matches the selected filtering condition; discriminately displaying at least one first display item matching the selected filtering condition from at least one second display item not matching the selected filtering condition among the plurality of the display items as a result of the determining step; and in response to a touch scroll command, scrolling the at least one first display item at a first speed and scrolling the at least one second display item only displayed on the touchscreen at a second speed lower than the first speed.

18 Claims, 12 Drawing Sheets

(56) References Cited

U.S. PATENT DOCUMENTS

| | | | |
|---|---|---|---|
| 2010/0277496 A1* | 11/2010 | Kawanishi | G06F 3/0485 345/589 |
| 2011/0069006 A1* | 3/2011 | Liu | G06F 3/0485 345/157 |
| 2011/0074699 A1* | 3/2011 | Marr | G06F 3/0485 345/173 |
| 2011/0238690 A1* | 9/2011 | Arrasvuori | G06F 3/04812 707/769 |
| 2012/0212407 A1* | 8/2012 | Tanaka | G06F 3/013 345/156 |
| 2013/0132883 A1* | 5/2013 | Vayrynen | G06F 3/0482 715/773 |

\* cited by examiner

FIG. 4
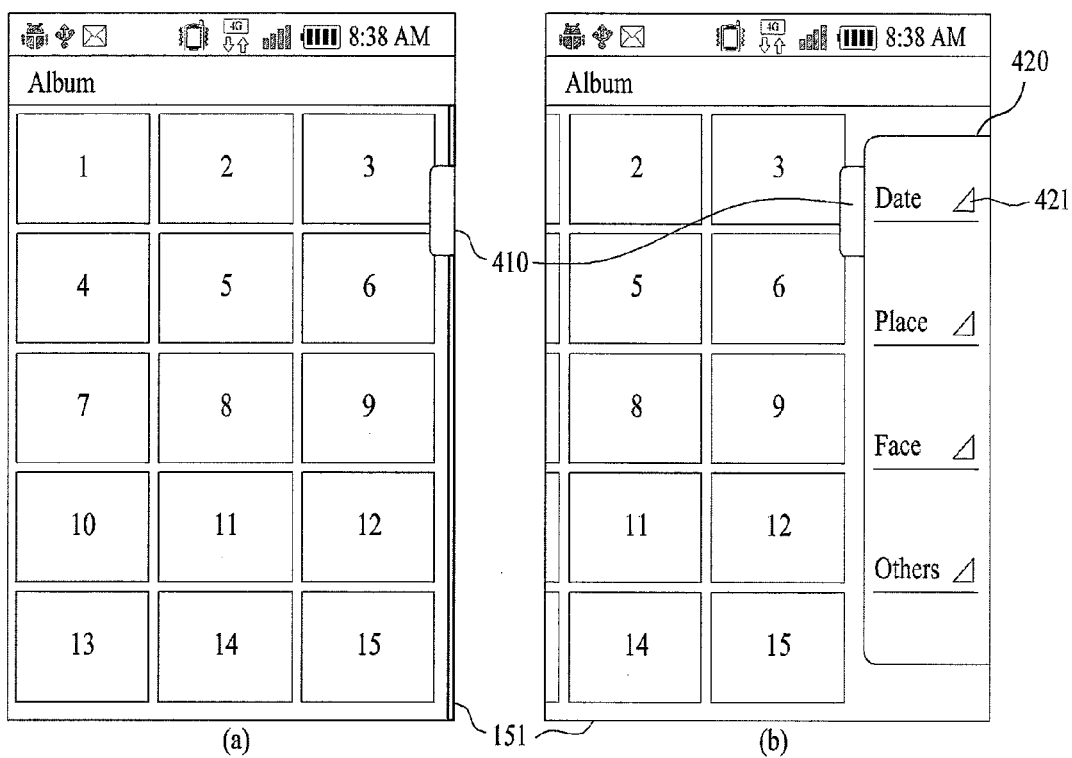
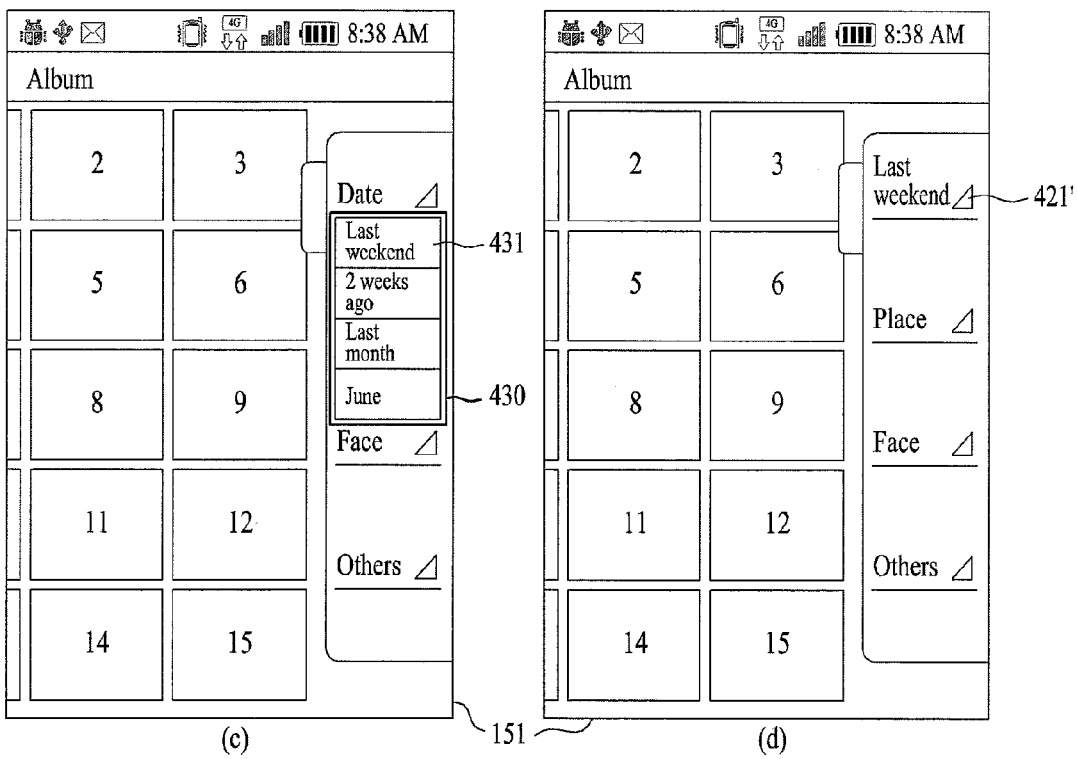

FIG. 5
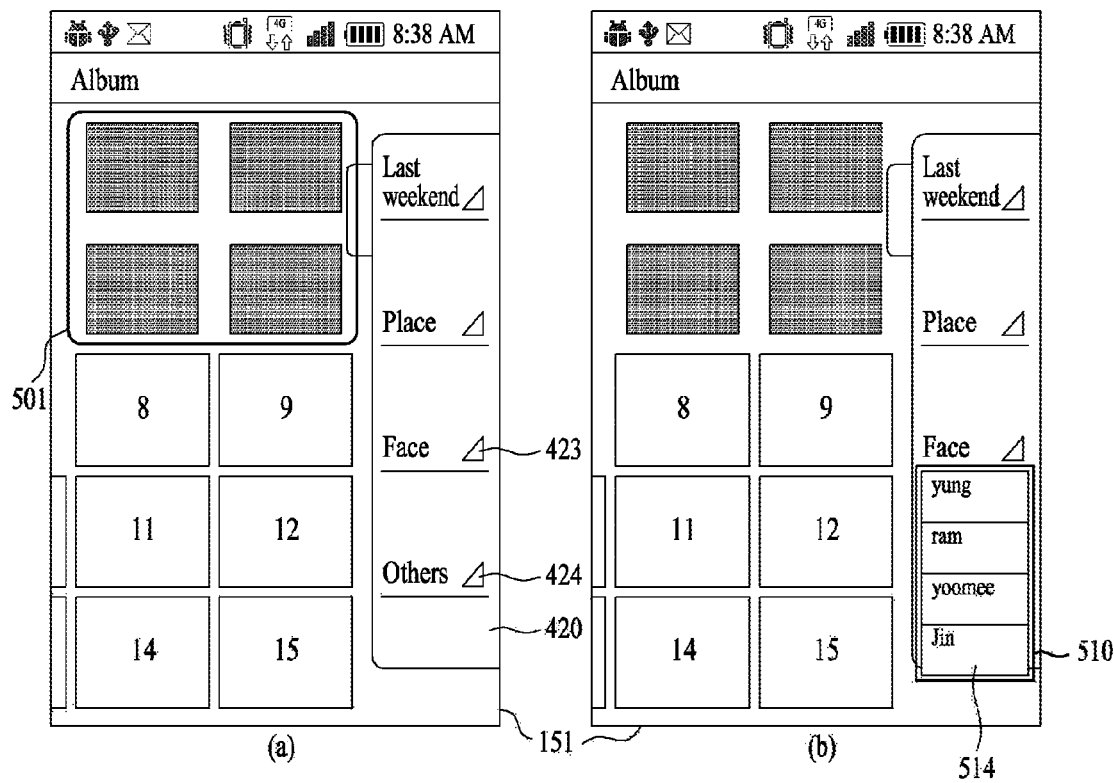
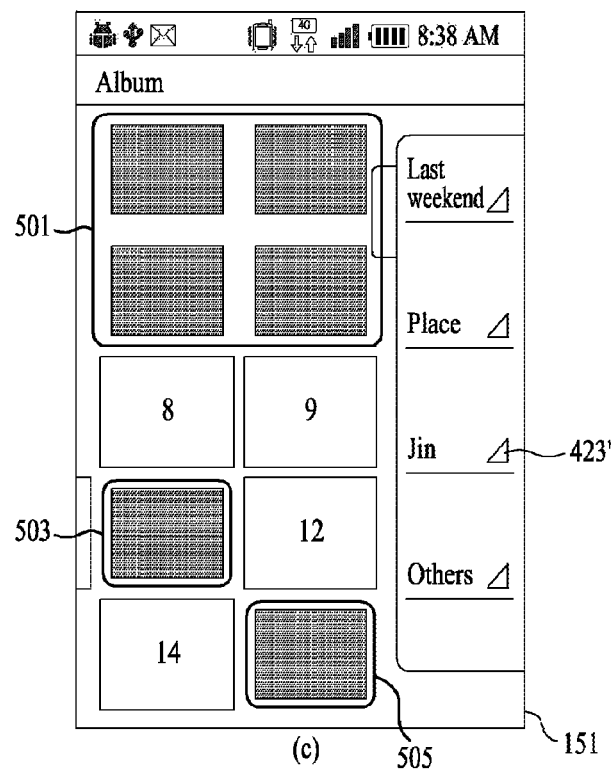

MOBILE TERMINAL AND CONTROLLING METHOD THEREOF

Pursuant to 35 U.S.C. §119(a), this application claims the benefit of earlier filing date and right of priority to Korean Patent Application No. 10-2012-0140196, filed on Dec. 5, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for conveniently checking an item matching various conditions in displaying a plurality of items.

Discussion of the Related Art

Generally, terminals can be classified into mobile/portable terminals and stationary terminals. The mobile terminals can be further classified into handheld terminals and vehicle mount terminals. As functions of the terminal are becoming diversified, the terminal is implemented as a multimedia player provided with composite functions such as photographing of photos or videos, playback of music or video files, game play, broadcast reception and the like for example.

Recently, as contents of various types and/or a massive quantity of information can be saved in or output through a smart type mobile terminal, the demand for a user to conveniently check or search for a user-desired content or information is rising.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which a user can conveniently check a user-desired information among various kinds of informations.

Another object of the present invention is to provide a mobile terminal and controlling method thereof, by which information matching a user-set condition can be conveniently found.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a touchscreen configured to display at least one portion of a plurality of display items and a controller, if at least one condition is selected, determining whether each of a plurality of the display items matches the selected at least one condition, the controller displaying at least one first display item matching the selected at least one condition and at least one second display item not matching the selected at least one condition among a plurality of the display items as a result of the determining step by discriminating the at least one first display item and the at least one second display item from each other using a prescribed visual effect, the controller controlling the at least one portion, displayed on the touchscreen, of a plurality of the display items, to be changed in response to a touch input applied through the touchscreen, the controller, if the touch input corresponds to a scroll command, performing a scroll by scrolling the at least one first display item displayed on the touchscreen at a first speed and scrolling the at least one second display item only displayed on the touchscreen at a second speed higher than the first speed.

In another aspect of the present invention, a method of controlling a mobile terminal according to one embodiment of the present invention may include the steps of displaying at least one portion of a plurality of display items on a touchscreen, selecting at least one condition, determining whether each of a plurality of the display items matches the selected at least one condition, displaying at least one first display item matching the selected at least one condition and at least one second display item not matching the selected at least one condition among a plurality of the display items as a result of the determining step by discriminating the at least one first display item and the at least one second display item from each other using a prescribed visual effect, and changing the at least one portion, displayed on the touchscreen, of a plurality of the display items in response to a touch input applied through the touchscreen, wherein if the touch input corresponds to a scroll command, the changing step is performed by scrolling the at least one first display item displayed on the touchscreen at a first speed and scrolling the at least one second display item only displayed on the touchscreen at a second speed higher than the first speed.

Effects obtainable from the present invention are non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram illustrating one example of a screen configuration for selecting a filtering condition in a mobile terminal according to one embodiment of the present invention;

FIG. 5 is a diagram illustrating one example of a screen configuration for selecting a filtering condition additionally in a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
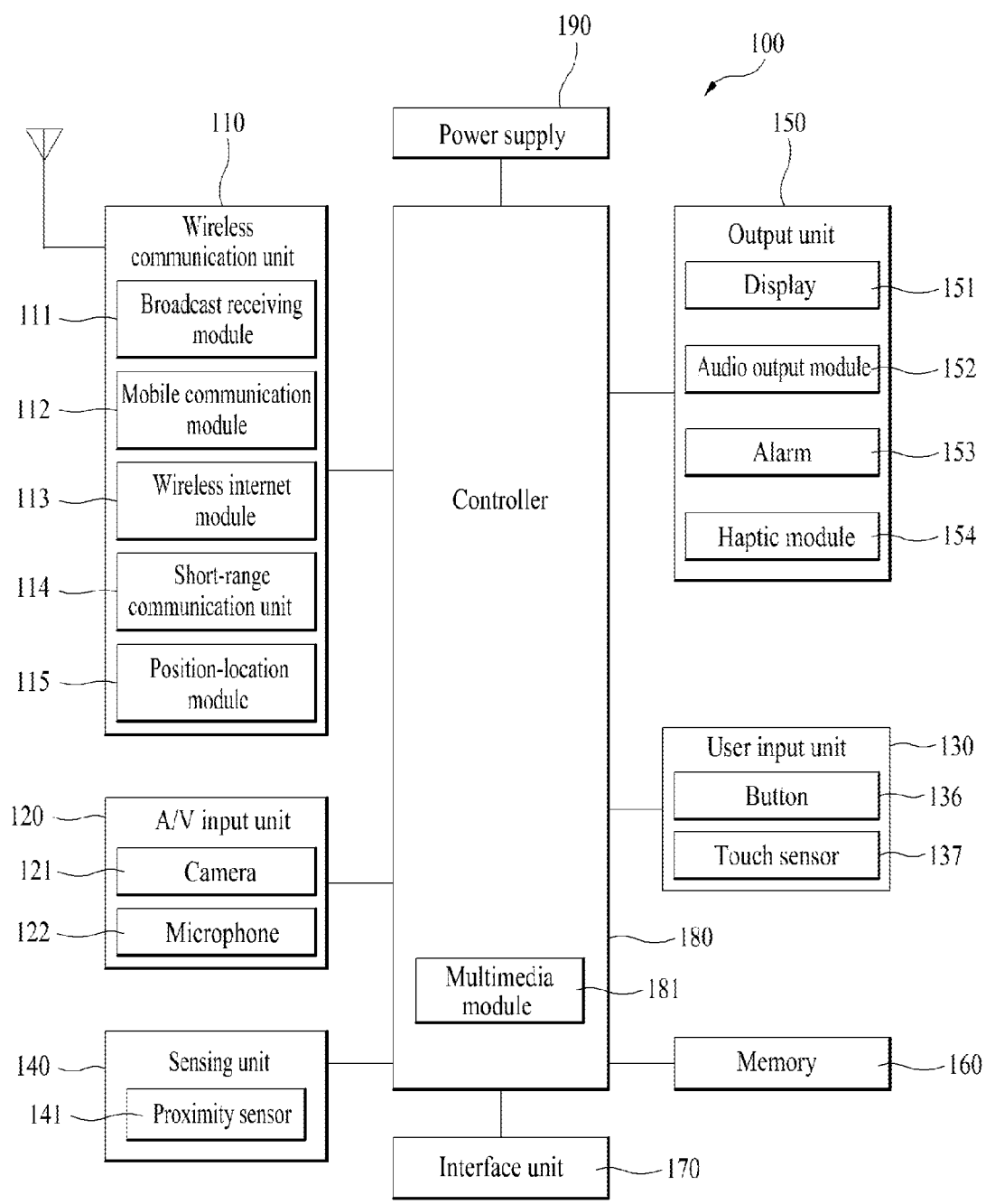
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 illustrates the user input 130 including a button 136 and a touch sensor 136.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154. A projector module can also be included in the output unit 150.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor 141 is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. And, a position, at which the proximity touch is made to the touchscreen using the pointer, may mean a position of the pointer vertically corresponding to the touchscreen when the pointer makes the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
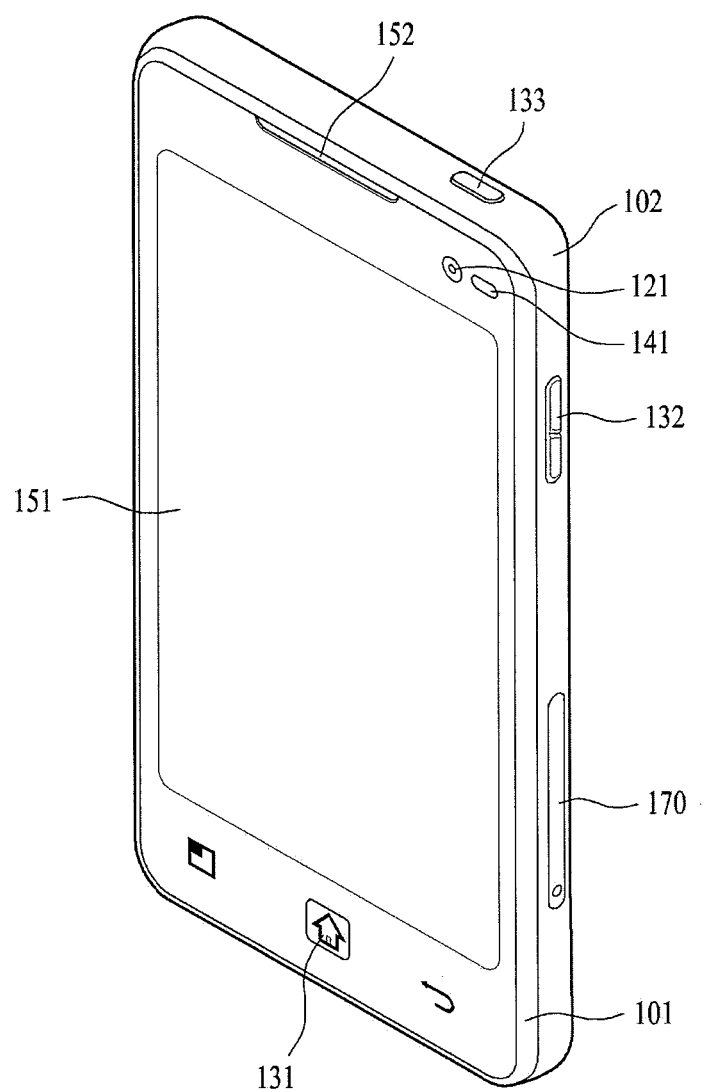
FIG. 2 is a front perspective diagram of a mobile terminal according to one embodiment of the present invention.

Next, FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure primarily relates to a bar-type mobile terminal 100. However, such disclosure may apply equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1). The proximity sensor 141 is also shown in FIG. 2.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132. A third manipulating unit 133 is also shown in FIG. 2.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical mechanism for performing a touch, a proximity touch, a gesture and the like as a finger, a stylus pen and the like is named a pointer.

Differential Application of Scroll Type Depending on Matched/Not-Matched Condition According to one embodiment of the present invention, if a filtering condition to be applied to a plurality of items is determined, a scroll speed is differentially applied on displaying each item depending on whether the determined condition is met. Together with the differential application of the scroll speed, a prescribed visual effect can be given to each item depending on whether a condition is met.

In the following description, a searching method according to an embodiment of the present invention is explained with reference to FIG. 3. In particular, FIG. 3 is a flowchart illustrating a method of applying a differential scroll speed to a plurality of items having visual effects given thereto depending on a selected condition in a mobile terminal according to one embodiment of the present invention.

Figure 3:
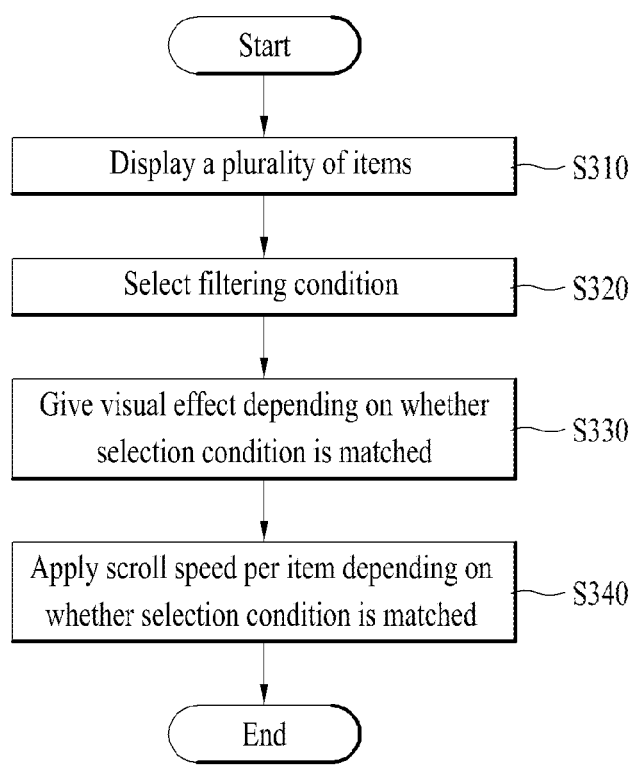
FIG. 3 is a flowchart illustrating a method of applying a differential scroll speed to a plurality of items having visual effects given thereto depending on a selected condition in a mobile terminal according to one embodiment of the present invention.

Referring to FIG. 3, at least one portion of a plurality of items (i.e., display items) outputtable as visual information are displayed on the touchscreen 151 (S310). In this instance, a plurality of the items may correspond to contents or information related to various applications, respectively. For instance, for a gallery application, each item may include a thumbnail corresponding to an image included in a specific storage location. In another instance, for a contact application, each item may include a contact item. In another instance, for a file seeker application, each item may include an icon, text or combination thereof, which corresponds to a file existing on a specific path of a file system. Moreover, a plurality of the items may not be displayed on a single screen. The items amounting to a range determined in accordance with settings may be displayed in part on a single screen. When all the items are not displayable on a single screen, a currently displayed item may be changed in response to a scroll command (e.g., a drag input, a flicking touch input, etc.) input by a user.

Subsequently, at least one filtering condition to be applied to a plurality of the items may be selected (S320). For example, the filtering condition may include one of a creation timing point of an item, a name of the item, attributes of meta information, tag information, location information related to the item, face recognition information and the like, by which the filtering conditions of the present invention are non-limited. For instance, any filtering conditions enough for the controller 180 to determine whether the corresponding filtering condition matches each item can be used for the filtering conditions of the present invention. A detailed method of selecting a filtering condition shall be described in detail later.

Once the selection of the filtering condition is completed, the controller 180 determines whether the selected condition matches each item and can then give a differential visual effect depending on a result of the determination (S330). For instance, the controller 180 enlarges and displays each item matching the selected condition among currently displayed items. In another instance, the controller 180 gives an outline effect to each item matching the selected condition among currently displayed items. In another instance, the controller 180 can display an item not matching the selected condition among currently displayed items by blurring the corresponding item. In another instance, when two filtering conditions are selected, the controller 180 can give different visual effect to items by discriminating an item meeting one filtering condition only from an item failing in meeting the filtering condition.

Moreover, the controller 180 can differentially apply a scroll speed per item depending on whether the selection condition is met (S340). For instance, in response to a scroll command on the same level, if an item matching the selected condition is displayed on the touchscreen, the controller 180 can control the corresponding item to be scrolled slowly until disappearing from the touchscreen. On the contrary, when an item not matching the selected condition is displayed on the touchscreen only, the controller 180 can control the displayed item to be scrolled relatively fast until an item matching the selected condition is displayed.

By the above-described method, a user can check a desired item slowly but quickly scroll the rest of items using a faster scroll speed, whereby an efficient item search can be performed.

In the following description, a process for selecting a filtering condition is explained with reference to FIGS. 4 and 5. In particular, FIG. 4 is a diagram illustrating one example of a screen configuration for selecting a filtering condition through a gallery application in a mobile terminal according to one embodiment of the present invention, and FIG. 5 is a diagram illustrating one example of a screen configuration for selecting a filtering condition additionally in a mobile terminal according to one embodiment of the present invention.

In the following drawings including FIG. 4, the plurality of items include image thumbnails displayed on the touchscreen 151 when the gallery application is activated. In particular, the image thumbnails may correspond to a plurality of image files saved at prescribed locations, respectively. Further, in order to clearly identify the thumbnails, a detailed image shape of each of the thumbnails can be substituted with a number.

Referring to FIG. 4(a), as a gallery application is activated based on the assumption, thumbnails respectively corresponding to a plurality of image files saved at specific locations are displayed on the touchscreen 151. When 15 thumbnails are set to be displayed as a default at a time in the gallery application, if the number of a plurality of the image files saved at the specific locations is greater than 15, a track and a handler 410 configured to move on the track in a portrait direction can be displayed. In this instance, the handler 410 is a scroll bar.

Further, a size and location of the handler 410 may be changed depending on locations and a rate of currently displayed items over the entire items. For instance, if the handler bar (i.e., scroll bar) is located at ⅓ point of the track from the top, this indicates that the currently displayed items are arranged at ⅓ point from the beginning of the entire items. The handler 410 may also be displayed irrespective of the relation between the maximum number of items displayed on a single screen and the number of the entire items if necessary.

If the maximum number of the items displayed on the single screen is equal to or smaller than the number of the entire items, the items may be replaced by other display objects (e.g., menu icons, etc.). The track can be named a scroll bar track and can indicate a movable range of the scroll bar. Generally, a length of the track corresponds to one side of a window on which the items are displayed. According to an embodiment of the present invention, assume that the track is arranged in a portrait direction. Occasionally, both a track and handler are named 'scroll bar' or a handler is named 'button', depending on an OS, a platform, an application or the like. In the present specification, the track and the handler are described as the aforementioned definition.

Meanwhile, if the handler bar 410 is selected (e.g., if the handler bar 410 is dragged in a left direction through a touch input), referring to FIG. 4b), the controller 180 can display an option menu bar 420 including a plurality of filtering conditions. Further, as the option menu bar 420 appears, a visual effect may be displayed by gradually pushing the thumbnails to the left. In FIG. 4(*b*), the filtering conditions displayed on the option menu bar 420 may include a date 421, a place, a face and others.

In more detail, the place condition is applicable if a location information (e.g., GPS coordinates, a name of the place, etc.) on an image created location is included in a header information of an image file corresponding to each thumbnail. If the face condition is selected, the controller 180 can perform a face recognition on an image corresponding to each thumbnail or determine whether an image corresponding to or including a specific character exists using a tag information related to a character. In addition, the condition 'Others' is described in detail later.

Subsequently, if the date condition 421 is selected, referring to FIG. 4(*c*), the controller 180 can display subordinate conditions 430 of the date condition in form of a drop-down menu. The subordinate conditions 430 may be discriminated from each other by prescribed period units, respectively. If the subordinate condition 'Last weekend' 431 is selected, referring to FIG. 4(*d*), a condition 'Last weekend' 421' is displayed on a spot where the date condition 421 used to be displayed, thereby indicating that the selection of the date condition is completed.

As the condition selection is completed, referring to FIG. 5(*a*), the controller 180 determines whether each of a plurality of images matches the selected condition and then controls the thumbnails 501, which correspond to the images not matching the selected condition, to be displayed by being blurred. Further, the controller 180 can determine whether the date condition is matched by checking a timing point of creating each image file or a time related information in the tag information set for each image file.

Thereafter, when a user intends to set a face filtering condition in addition, the user can select a face condition 423 from the option menu bar 420. Hence, referring to FIG. 5(*b*), the controller 180 can display the subordinate conditions 510 of the face condition in form of a drop-down menu. In this instance, each of the subordinate conditions may correspond to a name corresponding to the face recognition information previously obtained by the mobile terminal.

In this instance, if 'Jin' 514 is selected as the subordinate condition, referring to FIG. 5(*c*), 'Jin' 423' is displayed on the spot on which the face condition 423 used to be displayed, thereby indicating that the selection of the face condition is completed. Moreover, the controller 180 can control thumbnails 503 and 505, which correspond to images failing to include faces corresponding to the name 'Jin', to be additionally displayed by being blurred.

In addition, after the controller 180 has determined whether a plurality of thumbnails match the condition in continuation with the aforementioned filter condition selection, if the number or rate of the thumbnails matching the condition is smaller than a preset number, the controller 180 can automatically extend a search range. For instance, when the selected condition is 'Last weekend', if there is no search result or a search result does not meet a preset reference, the controller 180 can automatically extend the search range up to 'last Friday afternoon'. In another instance, when the face condition is selected as 'Jin', if there is no search result or a search result does not meet a preset reference, the controller 180 can automatically extend the search range up to faces resembling 'Jin' or images including other faces included in the image having the face of 'Jin' included therein.

Figure 6:
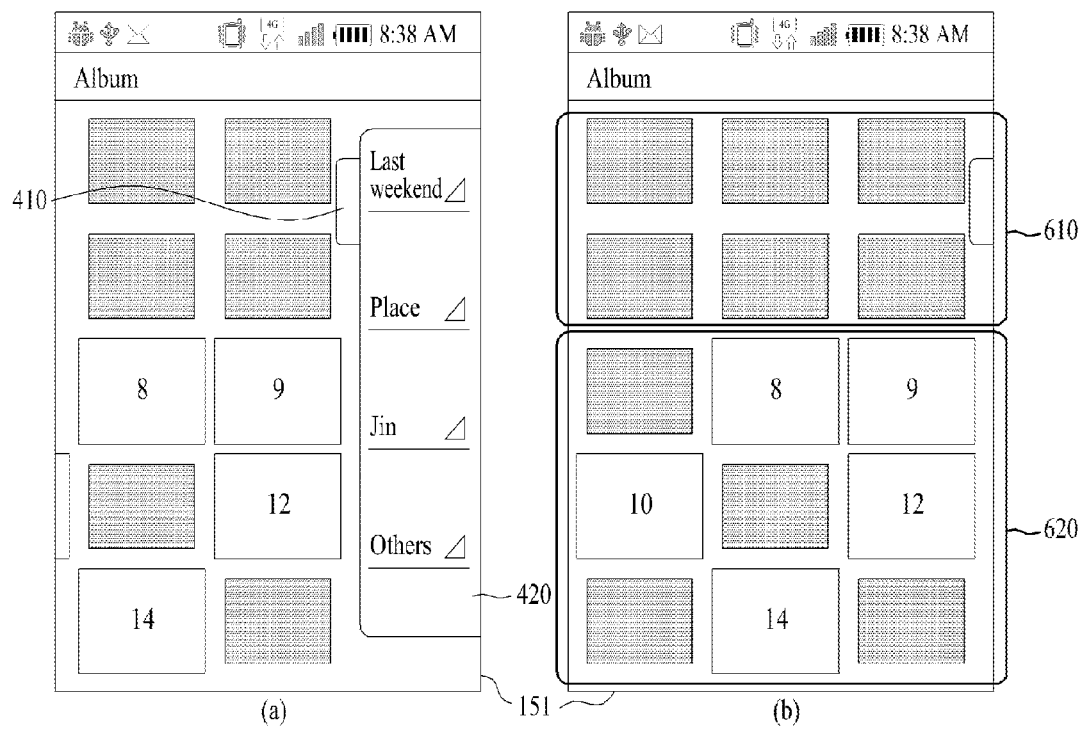
FIG. 6 is a diagram illustrating one example of a screen configuration for differentiating a scroll speed in response to a completion of a selection of a filtering condition in a mobile terminal according to one embodiment of the present invention.

In the following description, if a selection of a filtering condition is completed, a method of controlling an option menu bar to disappear and differentiating a scroll speed is explained in detail with reference to FIG. 6. In particular, FIG. 6 is a diagram illustrating one example of a screen configuration for differentiating a scroll speed in response to a completion of a selection of a filtering condition in a mobile terminal according to one embodiment of the present invention. FIG. 6 shows a process in continuation with the former process shown in FIG. 5.

Referring to FIG. 6(*a*), if the selection of the filtering condition is completed, the user can select the handler bar 410. For instance, the user can drag the handler bar 410 to the right. Hence, referring to FIG. 6(*b*), the menu bar 420 disappears and the thumbnails previously pushed to the left are displayed by moving back to the right. Alternatively, if a part except the handler bar 410 and the option menu bar 420 is selected, the state shown in FIG. 6(*b*) can be entered.

Thus, if the user intends to check other images matching the selected conditions, the user can input a command (e.g., a touch-drag in bottom direction, a flicking in bottom direction, etc.) for a scroll in a portrait direction. The controller 180 can change a scroll speed depending on whether each item, which is displayed when the scroll is performed in the portrait direction in response to the scroll command, meets the selected filtering condition. For instance, the thumbnails not matching the selected condition are scrolled fast, while the thumbnails including at least one portion of the thumbnails matching the selected condition are scrolled more slowly.

In this instance, if the scroll speed is different, it means that a scroll speed and/or a scroll distance is different in response to a same scroll command (e.g., when applying a touch-drag input by the same distance, when applying a flicking touch input at the same speed). If either the thumbnails not matching the condition or the thumbnails matching the condition exist on a full screen only, the scroll speed corresponding to each case may be applicable consistently.

However, when the thumbnails 610 not matching the selected condition and the thumbnails 620 including at least one thumbnail matching the selected condition are displayed on a single screen, as shown in FIG. 6(*b*), it may cause a problem. In this instance, the scroll can be performed slowly while at least one of the thumbnails matching the condition is displayed on the screen. Further, the scroll can be performed fast until all the thumbnails 610 not matching the condition disappear. On the other hand, if a plurality of filtering conditions are selected on the condition of 'or' instead of 'and', the scroll speed may get slower while an item (or thumbnail) meeting more filtering conditions is displayed.

Figure 7:
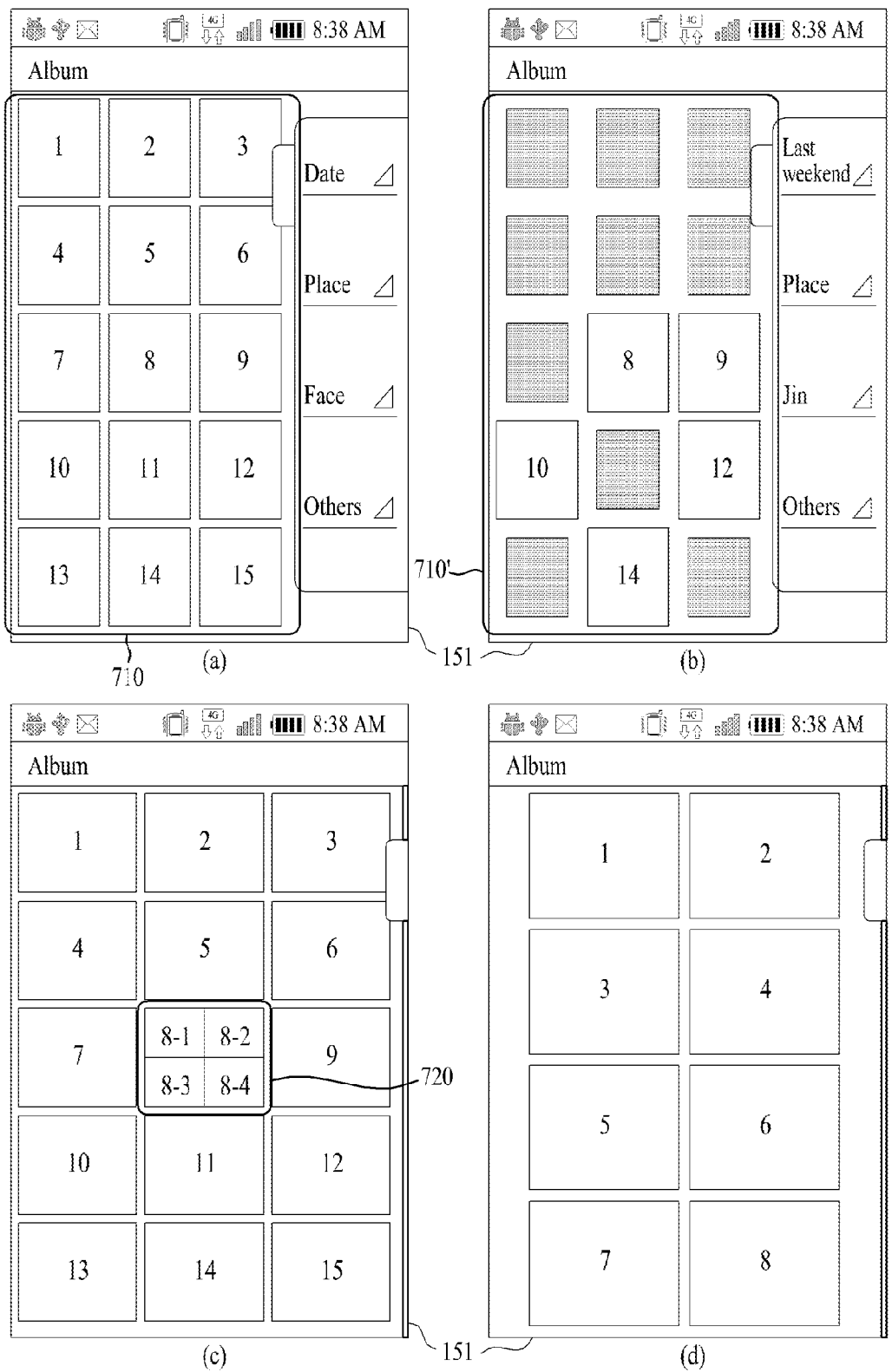
FIG. 7 is a diagram illustrating various screen configurations for displaying a plurality of items in a mobile terminal according to one embodiment of the present invention.

In the following description, various kinds of methods of displaying thumbnails are explained with reference to FIG. 7. In particular, FIG. 7 is a diagram for various screen configurations for displaying a plurality of items in a mobile terminal according to one embodiment of the present invention.

In the description with reference to FIGS. 4 to 6, as the handler bar is selected and the option menu bar is then displayed, the thumbnails are pushed to the left. However, referring to FIG. 7(*a*), thumbnails 710 can be compressed in a landscape direction overall. Thus, if filtering conditions are selected, referring to FIG. 7(*b*), a visual effect can be given to thumbnails 710' depending on whether the condition is met.

Moreover, when a thumbnail corresponding to an image file included in a specific location is displayed, if a folder including a plurality of image files exists at the corresponding location, referring to FIG. 7(c), a plurality of thumbnails 720 corresponding to the image files included in the corresponding folder can be displayed on a region amounting to a size of a single thumbnail by being partitioned.

Meanwhile, the controller 180 can change the number of thumbnails displayed on a single screen depending on the number of the whole images. For instance, when the number of images is relatively small, referring to FIG. 7(d), 8 thumbnails can be displayed on a single screen instead of 15 thumbnails. Moreover, a unit of subordinate conditions of a weather related condition can be automatically changed on the option menu bar depending on the number of the whole images. For instance, if the number of the whole images is 100, the subordinate condition of the date condition may be set to a monthly unit. In another instance, if the number of the whole images is 20, the subordinate condition of the date condition may be set to a weekly unit.

In the following description, a method of displaying a selected condition after disappearance of an option menu bar and a process for giving a different visual effect depending on the number of matched conditions when selecting a plurality of conditions are explained in detail with reference to FIG. 8.

Figure 8:
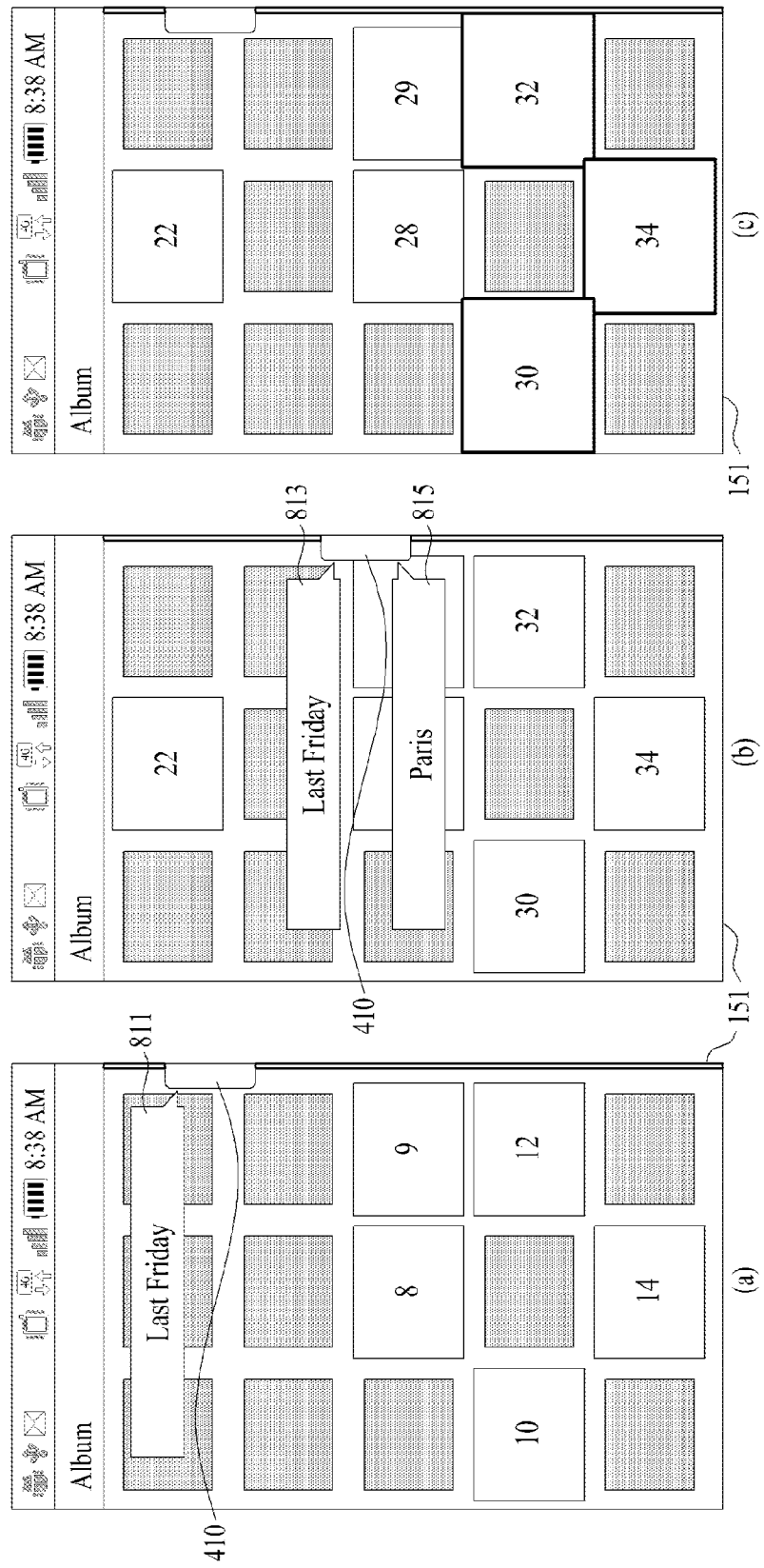
FIG. 8 is a diagram illustrating a method of displaying a selected condition after disappearance of an option menu bar and a screen configuration for giving different visual effects depending on the number of the matched conditions when selection of a plurality of conditions in a mobile terminal according to one embodiment of the present invention.

In particular, FIG. 8 is a diagram illustrating one example of a method of displaying a selected condition after disappearance of an option menu bar and a screen configuration for giving different visual effects depending on the number of the matched conditions when selection of a plurality of conditions in a mobile terminal according to one embodiment of the present invention.

Referring to FIG. 8(a), if a single date condition 'Last Friday' is selected, a word balloon 811 corresponding to the selected condition can be displayed adjacent to a handler bar 410. When a location of the handler bar 410 is changed, a location of the word balloon 811 can be changed together. Referring to FIG. 8(b), if 'Paris' is selected as a place condition as well as the date condition 'Last Friday', word balloons 813 and 815 respectively corresponding to the selected two conditions can be displayed adjacent to the handler bar 410.

Meanwhile, when a plurality of filtering conditions are selected, a different visual effect can be given depending on the number of matched conditions. For instance, referring to FIG. 8(c), the thumbnails 22, 28 and 29 not matching any one of the two conditions are displayed by being blurred, the thumbnails matching one of the two conditions are displayed intact, and the thumbnails 30, 32 and 34 matching both of the two conditions are displayed by being enlarged at a predetermined rate with a thick outline effect.

In the following description, various functions of a handler bar and track are explained in detail with reference to FIG. 9. In particular, FIG. 9 is a diagram illustrating one example of a screen configuration of a handler bar and a track depending on deployment of an item matching a selected filtering condition in a mobile terminal according to one embodiment of the present invention.

Figure 9:
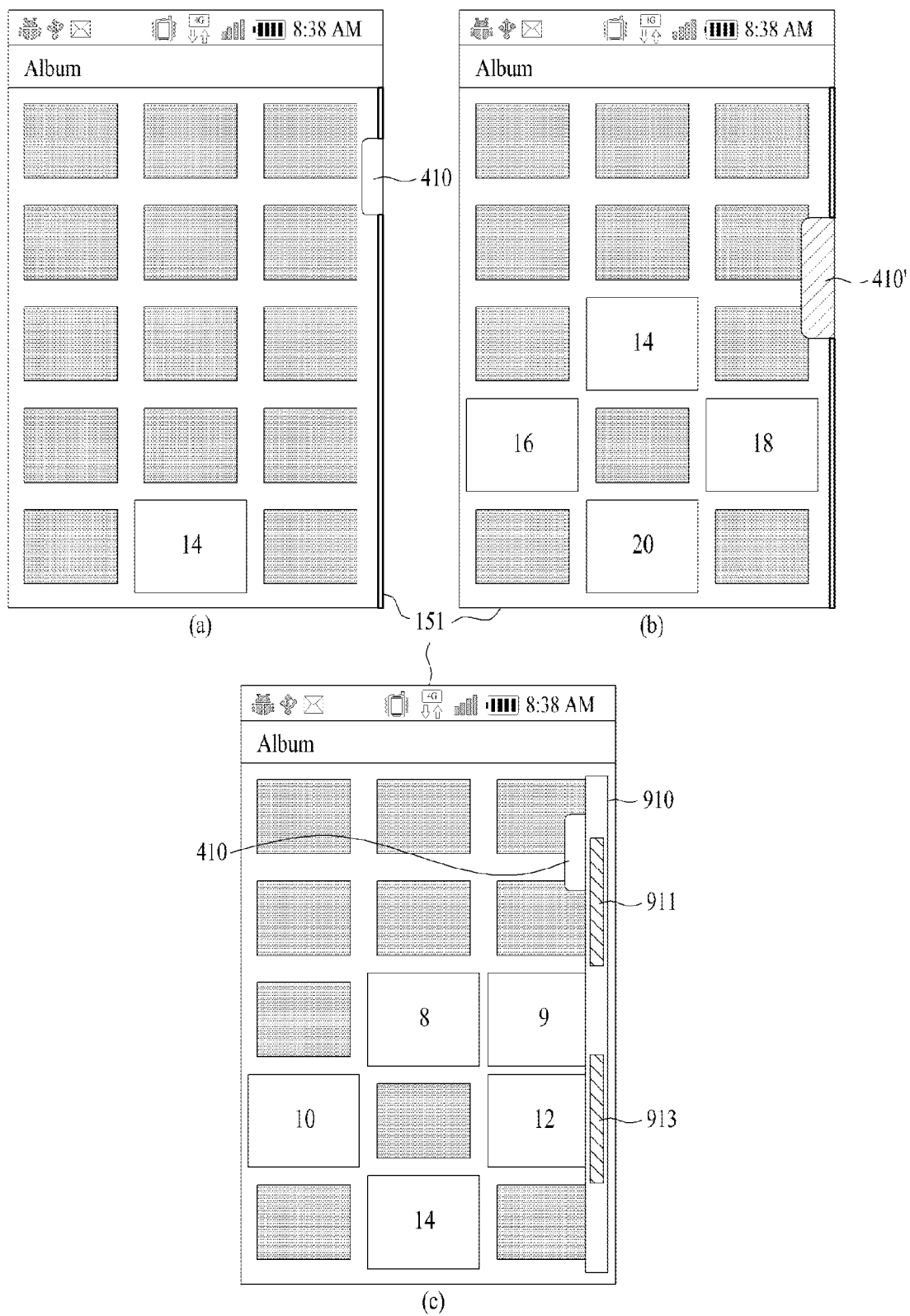
FIG. 9 is a diagram illustrating one example of a screen configuration of a handler bar and a track depending on deployment of an item matching a selected filtering condition in a mobile terminal according to one embodiment of the present invention.

Referring to FIG. 9, a handler bar 410 corresponds to when there is one thumbnail matching a selected condition (FIG. 9(a)). Further, a handler bar 410' corresponds to when there are many thumbnails matching the selected condition (FIG. 9(b)). Thus, a size of the handler bar 410' shown in FIG. 9(b) may increase greater than that of the former handler bar 410 shown in FIG. 9(a) in proportion to the number of the thumbnails matching the selected condition. In addition, various visual effects other than the increasing size of the handler bar can be given.

On the other hand, referring to FIG. 9(c), indicators 911 and 913 can be displayed within a track 910 to indicate where the items matching the condition are located. In particular, the track 910 corresponds to the entire items, each of the indicators indicates approximate locations of the items matching the condition among the entire items as relative locations within the track, and a length of each of the indicators can indicate an approximate amount of the items matching the condition. Using the indicators, a user can be conveniently aware how many and where the items matching the condition among the entire items exist.

Meanwhile, although a scroll speed is differentially applied depending on whether a selected condition is met, if there is no item matching the condition after a currently displayed part, a further scroll may become meaningless. Therefore, a more efficient searching method according to one embodiment of the present invention is described in detail with reference to FIG. 10 as follows.

Figure 10:
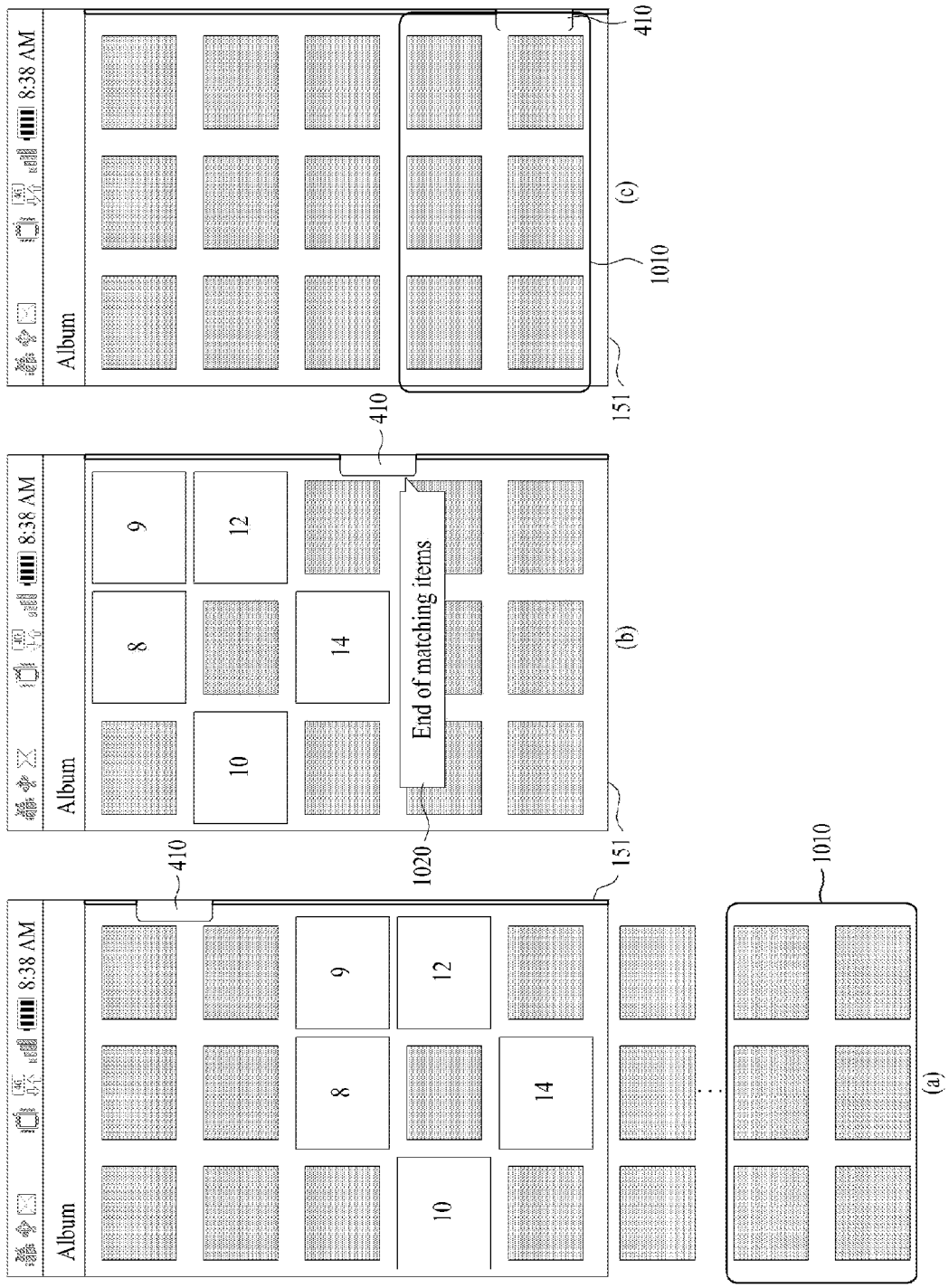
FIG. 10 is a diagram illustrating one example of an efficient searching method in a mobile terminal according to one embodiment of the present invention.

FIG. 10 is a diagram illustrating one example of an efficient searching method in a mobile terminal according to one embodiment of the present invention. In particular, FIG. 10(a) shows a situation after an option menu bar has disappeared since the completion of the selection of a filtering condition. In particular, assume a situation that there are no thumbnails matching a selected condition up to the last thumbnails 1010 except the thumbnails 8, 9, 10, 12 and 14 currently displayed on a screen.

Thus, if a user inputs a scroll command in a bottom direction or drags down a handler bar 410, referring to FIG. 10(b), a message 1020 indicating that there are no more thumbnails matching the condition in the bottom direction can be output. A bouncing effect may also be given together with or separately from the message 1020. In particular, when the user inputs the scroll command in the bottom direction, if the controller 180 determines that there are no more thumbnails matching the condition in the bottom direction, the controller 180 can give a bouncing-back visual effect by stopping the scroll and then resuming the scroll in a top direction by a prescribed distance.

Through such a method, the user can be aware that there are no more thumbnails matching the condition below the currently displayed thumbnails. Meanwhile, after the message 1020 has been displayed or the bouncing effect has been given, if the user re-inputs a scroll command in the bottom direction, referring to FIG. 10(c), a last thumbnail part 1010 can be displayed. Thereafter, if the user inputs a scroll command in the top direction again, the controller 180 can control the thumbnails matching the condition to be directly displayed, as shown in FIG. 10(b), irrespective of a length or sped of the drag or flicking touch for the scroll.

According to one embodiment of the present invention, items matching a selected condition are gathered and displayed. This is described in detail with reference to FIG. 11 as follows. In particular, FIG. 11 is a diagram illustrating one example of a method of gathering items matching a selected condition in a mobile terminal according to one embodiment of the present invention.

Figure 11:
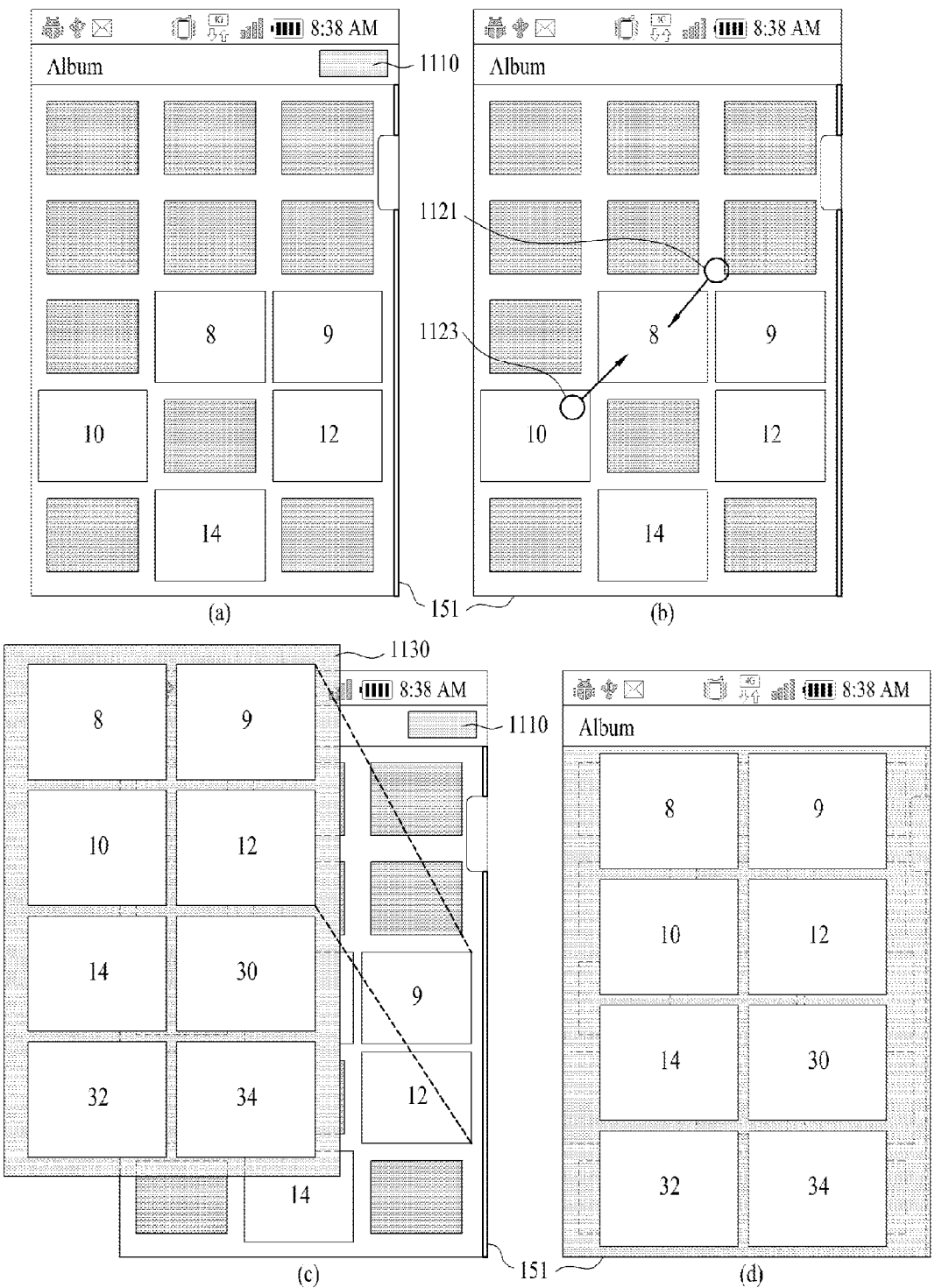
FIG. 11 is a diagram illustrating one example of a method of gathering items matching a selected condition in a mobile terminal according to one embodiment of the present invention.

Referring to FIG. 11, as a selection of a condition is completed according to one of the embodiments of the present invention mentioned in the foregoing description, a visual effect is given depending on whether the condition is met. Secondly, items matching the condition are gathered and displayed on a layer (hereinafter named 'collective view layer', for clarity) displayed as a most upper layer.

For example, referring to FIG. 11(a), a collective view menu icon 1110 is arranged on the touchscreen 151. If the icon 1110 is selected, the collective view layer is displayed.

In another example, referring to FIG. 11(b), after a touch input (e.g., an input applied by touching two random points 1121 and 1123 and then dragging the two touched points closer to each other (i.e., pinching-in)) of a specific pattern has been applied, the collective view layer can be displayed.

Examples of the configuration of the collective view layer is shown in FIG. 11(c) and FIG. 11(d). In particular, FIG. 11(c) conceptually illustrates how the collective view layer 1130 is configured and FIG. 11(d) shows an actual configuration of the collective view layer displayed on the touchscreen.

Referring to FIG. 11(c), thumbnails matching a condition on a currently displayed screen can be displayed on the collective view layer 1130 by being enlarged at a predetermined ratio in order. In particular, when the thumbnails 8, 9, 10, 12 and 14 matching the condition are displayed in order on a currently displayed screen in FIG. 11(c), these thumbnails are displayed on the collective view layer 1130 by being enlarged and sorted in order. For instance, if a scroll command is input in a bottom direction, the thumbnails 8, 9, 10 and 12 disappear in a top direction of the screen. If the thumbnail 14 is a first thumbnail matching the condition in the currently displayed screen, the thumbnail 14 can be enlarged and displayed on a left top end of the collective view layer 1130.

If a prescribed transparency is given to the collective view layer 1130, a user is facilitated to check an arrangement situation of the whole thumbnails below the collective view layer 1130. When the collective view layer 1130 is displayed, a scroll command can be input onto the collective view layer 1130. Using the above-described collective view layer function, a user can collect and check the items matching a condition only more conveniently and carefully.

In addition, if a key button corresponding to a cancel function is selected or a touch input (i.e., a pinch-out input) reverse to the former touch input shown in FIG. 11(b) is input, the collective view layer 1130 may disappear. Of course, the touch input pattern may be applicable by switching roles of the pinch-in action and the pinch-out action to each other or may be substituted with a touch input of another pattern.

Figure 12:
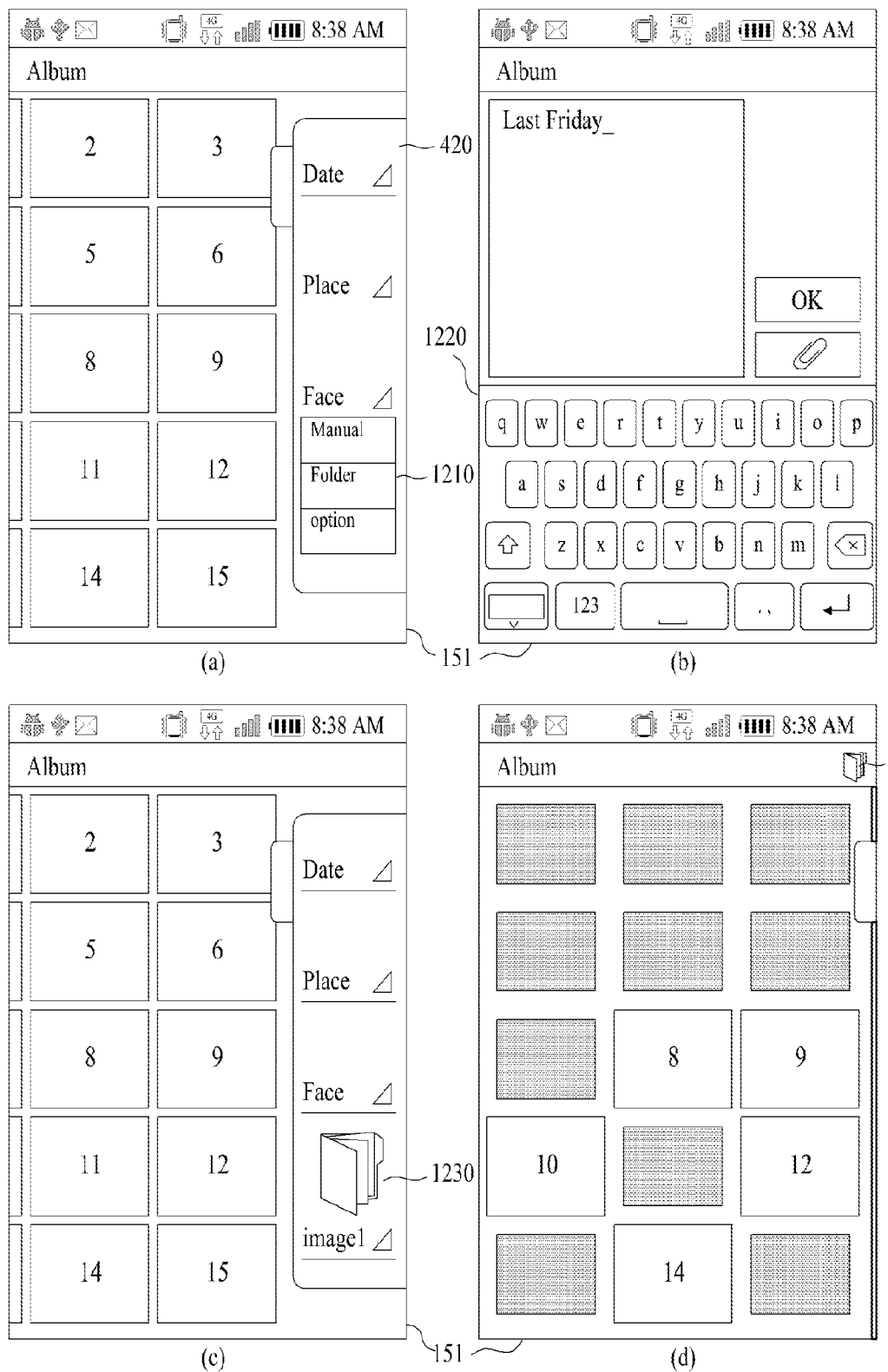
FIG. 12 is a diagram illustrating one example of a screen configuration for determining a filtering option through other conditions in a mobile terminal according to one embodiment of the present invention.

In the following description, the condition 'Others' is explained in detail with reference to FIG. 12. In particular, FIG. 12 is a diagram illustrating one example of a screen configuration for determining a filtering option through other conditions in a mobile terminal according to one embodiment of the present invention. FIG. 12 illustrates a situation after selection of the condition 'Others' menu 424 in FIG. 5.

Referring to FIG. 12(a), subordinate conditions of the condition 'Others' are displayed as a drop-down box 1210. If the subordinate condition 'Manual' is selected from the drop-down box 1210, referring to FIG. 12(b), a user interface 1220 for a text input can be displayed on the touchscreen 151. Using the user interface 1220, a user can input a filtering condition displayed on an option menu bar 420 directly or a condition not displayed on the option menu bar 420.

For instance, if a weather condition is set by a weekly unit, the user selects the present condition and can then input a detailed condition such as 'Last Friday' and the like. Moreover, the user can input a condition of a search type (e.g., 'Last Friday' and 'New York', etc.) through the user interface. The controller 180 can apply a context-aware function to the input text. For instance, if a text 'last summer' is input, the controller 180 determines a last year as a current year (e.g., 2012) and recognizes the word 'summer' as 'June to August', thereby determining that the user intends to set the search condition as images photographed June to August in 2011.

If the subordinate condition 'Folder' is selected in the situation shown in FIG. 12(a), a user interface for selecting a prescribed folder in a storage space of the mobile terminal is displayed and can then select a specific folder. In this instance, referring to FIG. 12(c), a folder icon 1230 indicating that the specific folder has been selected can be displayed on a location where the condition 'Others' menu 424 was displayed in the option menu bar 420.

Thereafter, referring to FIG. 12(d), if the option menu bar 420 disappears, an icon 1230' corresponding to the selected folder can be displayed on a right top end. In this instance, the user can conveniently manage files by dragging a desired thumbnail among currently displayed thumbnails to the icon 1230' corresponding to the selected folder. This function facilitates a job for a user to move an image file meeting a specific condition to a single folder only or a job for a user to move an image file not meeting a condition to another folder from a currently saved location. Instead of displaying a user interface for selecting a folder, it is a matter of course that a predetermined folder can be directly selected. Moreover, a thumbnail can be dragged to the icon 1230 in the situation shown in FIG. 12(c).

Meanwhile, according to the embodiments mentioned in the foregoing description, if a scroll bar (or a handler bar) is dragged in a direction different from a track direction, an option menu bar appears for example, by which the present invention is non-limited. Further, the option menu bar can be paged in various ways. For instance, when a separate display object is displayed on a touchscreen irrespective of a display of a scroll bar and a track, if the corresponding object is dragged or simply touched, an option menu bar can be displayed.

According to the embodiments mentioned in the foregoing description, a scroll speed is differentially applied depending on whether a selected filtering condition is met. However, according to another embodiment of the present invention, a scroll unit can be changed. For instance, when images are sorted by creation time units, a condition for determining a scroll unit can be displayed on an option menu bar. If a monthly unit condition is selected, a scroll can be performed by a monthly unit of creation time each time a scroll command is input once. In particular, when thumbnails corresponding to images photographed on January are currently displayed, if a scroll command is input once, thumbnails corresponding to images photographed on February can be displayed in direct while the thumbnails corresponding to the images photographed on January are scrolled.

According to another embodiment of the present invention, if a selected condition is a date (or time), if a user inputs a scroll command per unit time over a predetermined level (i.e., frequently inputting a command for a fast scroll), the controller 180 can control a scroll to be performed by predetermined period units. The reason for this is to provide a user with convenience in checking next items by quickly turning items currently displayed on a screen.

For instance, assume that a filtering condition is selected as images photographed on March and that a user is interested not in the images photographed in the early of March but in the images photographed after the middle of March only. In this instance, if the images photographed in the early March start to be displayed on the touchscreen, the user repeatedly inputs a scroll command to check the images photographed after the middle of March. If so, the controller 180 determines that the user desires a fast scroll and then controls a scroll command, which is input after the timing point of the determination, to enable a scroll by a weekly unit per command. In this instance, the scroll unit period can be determined in consideration of the number of items meeting a selected condition or the number of the entire items.

According to the embodiments mentioned in the foregoing description, a location and shape of a handler bar and the types of filtering conditions included in an option menu bar are described, for example, by which the present invention is non-limited. However, the present invention is applicable to more various situations.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

Accordingly, the present invention provides several advantages. First, the present invention gives a visual effect by discriminating items matching a selected condition from other items not matching the selected condition, thereby enabling a user to conveniently check a user-desired item.

Secondly, the present invention applies differential scroll speeds to a selected condition matching item and a selected condition not-matching item, respectively, thereby enabling a user to search for an item matching the condition comfortably and conveniently using a scroll.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
displaying a plurality of display items on a touchscreen of the mobile terminal;
determining, via a controller of the mobile terminal, whether each of the plurality of the display items matches at least one filtering condition;
discriminately displaying at least one first display item matching the at least one filtering condition from at least one second display item not matching the at least one filtering condition among the plurality of the display items as a result of the determining step;
displaying at least one indicator corresponding to a location of the at least one first display item on a track, in a size corresponding to a number of the at least one first display item;
in response to a touch scroll command, scrolling at a first speed when the touchscreen displays the at least one first display item and scrolling at a second speed when the touchscreen displays only the at least one second display item, and
displaying only the at least one first display item on a collective view layer displayed as an uppermost layer in the touchscreen,
wherein the displaying only the at least one first display item on the collective view layer comprises displaying the collective layer when a collective view menu icon is selected or a specific pattern has been applied.

2. The method of claim 1, further comprising:
displaying a menu bar including a plurality of available filtering conditions; and
selecting the at least one filtering condition from the menu bar.

3. The method of claim 2, further comprising:
displaying a scroll bar movable on the track in a first direction for scrolling the plurality of display items based on a touch and drag of the scroll bar; and
displaying the menu bar based on a touch and drag of the scroll bar in a second direction substantially perpendicular to the first direction.

4. The method of claim 3, further comprising:
changing at least one of a shape and color of the scroll bar based on a number of the at least one first display item.

5. The method of claim 1, wherein the displaying at least one indicator comprises:
displaying the at least one indicator in a length corresponding to the number of the at least one first display item.

6. The method of claim 1, wherein the plurality of the display items include a plurality of thumbnails corresponding to a plurality of images, respectively.

7. The method of claim 6, wherein the at least one filtering condition includes at least one of time created information of the plurality of the images, place information related to the plurality of the images and character information on characters included in the plurality of the images.

8. The method of claim 1, wherein the displaying at least one first display item comprises:
applying a different visual effect to each first display item based on a number of matched filtering conditions among the at least one filtering condition.

9. The method of claim 1, wherein the at least one filtering condition is determined by a text input by a user.

10. A mobile terminal, comprising:
a touchscreen configured to display a plurality of display items; and
a controller configured to:
determine whether each of the plurality of the display items matches at least one filtering condition,
discriminately display at least one first display item matching the at least one filtering condition from at least one second display item not matching the at least one filtering condition among the plurality of the display items as a result of the determination,
display at least one indicator corresponding to a location of the at least one first display item on a track, in a size corresponding to a number of the at least one first display item, in response to a touch scroll command, scroll at a first speed when the touchscreen displays the at least one first display item and scroll at a second speed when the touchscreen displays only the at least one second display item, and display only the at least one first display item on a collective view layer displayed as an uppermost layer in the touchscreen, wherein the controller is further configured to display the collective layer when a collective view menu icon is selected or a specific pattern has been applied.

11. The mobile terminal of claim 10, wherein the controller is further configured to:

display a menu bar including a plurality of available filtering conditions, and receive the selection of the at least one filtering condition from the menu bar.

12. The mobile terminal of claim 11, wherein the controller is further configured to:

display a scroll bar movable on the track in a first direction for scrolling the plurality of display items based on a touch and drag of the scroll bar, and display the menu bar based on a touch and drag of the scroll bar in a second direction substantially perpendicular to the first direction.

13. The mobile terminal of claim 12, wherein the controller is further configured to:

change at least one of a shape and color of the scroll bar based on a number of the at least one first display item.

14. The mobile terminal of claim 10, wherein the controller is further configured to:

display the at least one indicator in a length corresponding to the number of the at least one first display item.

15. The mobile terminal of claim 10, wherein the plurality of the display items include a plurality of thumbnails corresponding to a plurality of images, respectively.

16. The mobile terminal of claim 15, wherein the at least one filtering condition includes at least one of time created information of the plurality of the images, place information related to the plurality of the images and character information on characters included in the plurality of the images.

17. The mobile terminal of claim 10, wherein the controller is further configured to:

apply a different visual effect to each first display item based on a number of matched filtering conditions among the at least one filtering condition.

18. The mobile terminal of claim 10, wherein the at least one filtering condition is determined by a text input by a user.

* * * * *